2,649,132

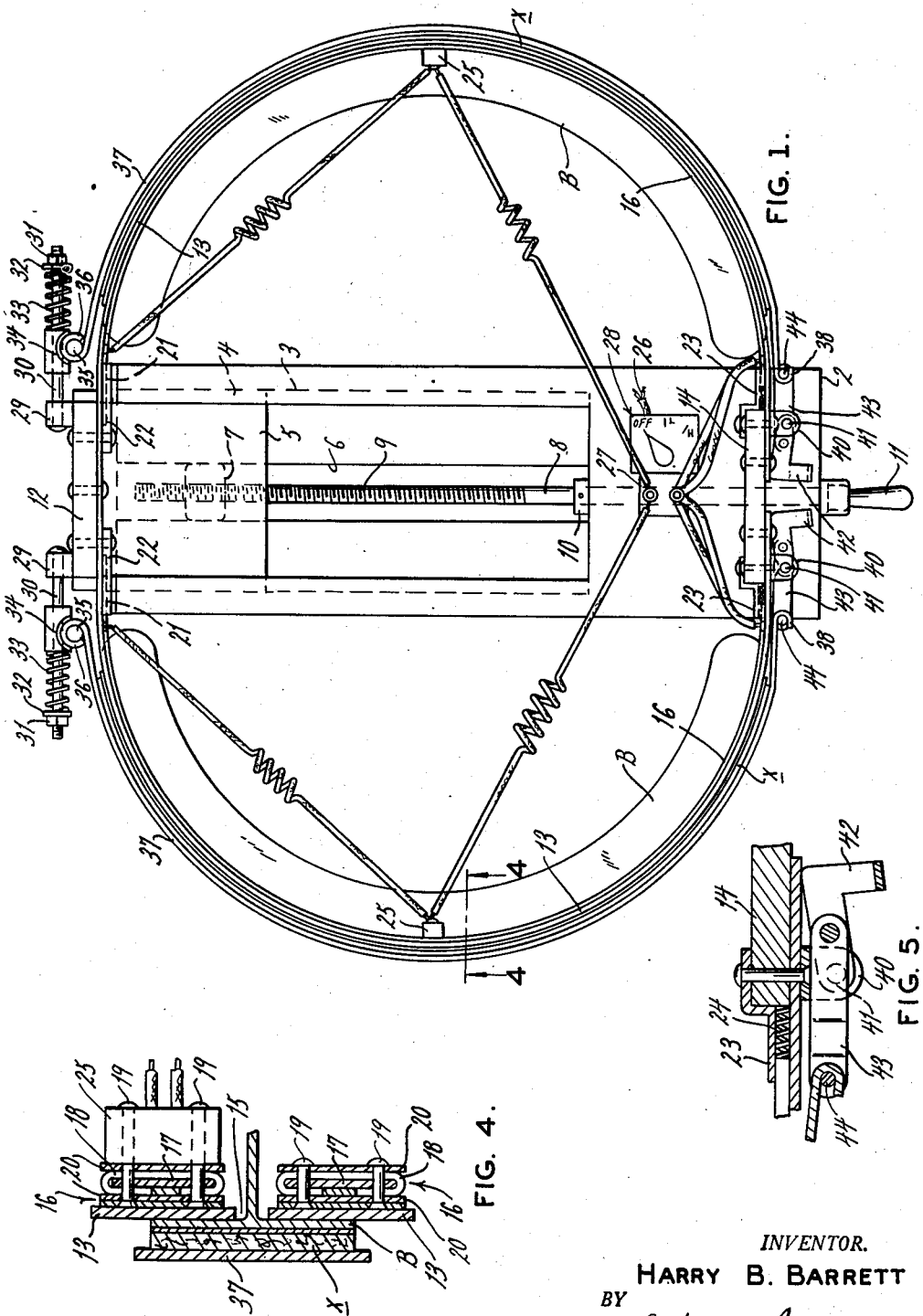
Aug. 18, 1953  H. B. BARRETT  2,649,132
BRAKE SHOE BONDING MACHINE
Filed Aug. 28, 1950  2 Sheets-Sheet 1
INVENTOR.
HARRY B. BARRETT
BY
ATTORNEY Aug. 18, 1953 H. B. BARRETT 2,649,132
BRAKE SHOE BONDING MACHINE
Filed Aug. 28, 1950 2 Sheets-Sheet 2
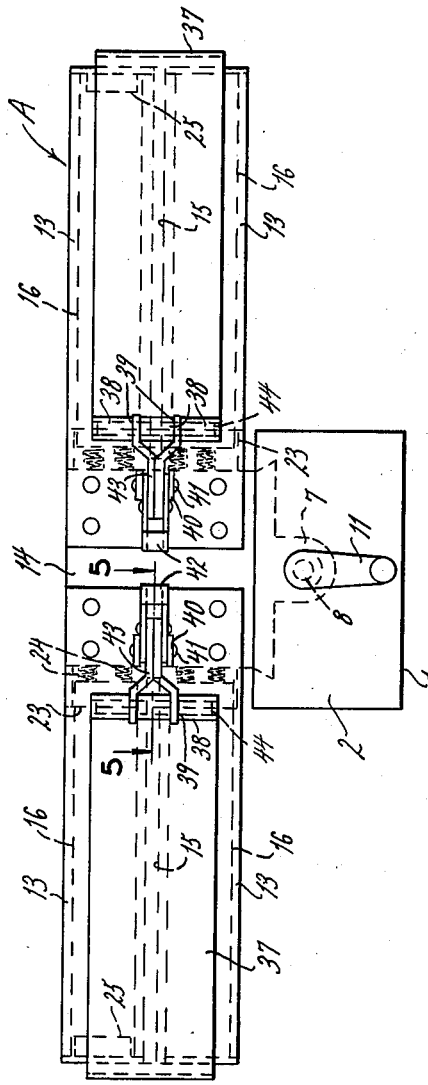
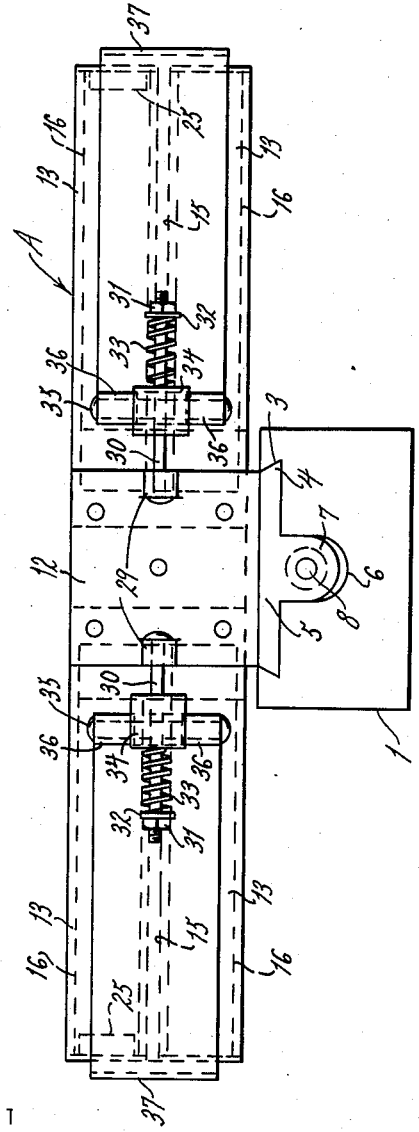
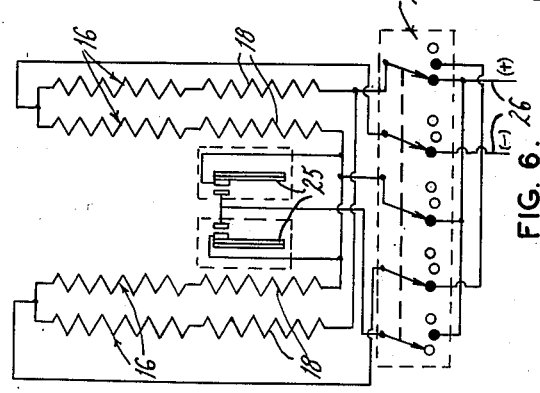
INVENTOR.
HARRY B. BARRETT
BY
ATTORNEY Patented Aug. 18, 1953

UNITED STATES PATENT OFFICE 2,649,132

BRAKE SHOE BONDING MACHINE

Harry B. Barrett, St. Louis, Mo.

Application August 28, 1950, Serial No. 181,785

9 Claims. (Cl. 154—1)

1

This invention relates in general to certain new and useful improvements in brake shoe relining devices and more particularly to a machine for accomplishing the several operations incident to effecting securement of brake lining to an automobile brake shoe by means of a thermosetting adhesive or the like.

It is the primary object of the present invention to provide a simple, highly efficient, inexpensive brake shoe relining machine which is capable of effecting a bond between brake lining material and a brake shoe by means of a thermosetting adhesive or the like.

It is a further object of the present invention to provide a brake shoe relining device of the type stated which can be readily adjusted to fit a wide range of types and varieties of brake shoes and can be so adjusted quickly and simply by the ordinary repair shop mechanic.

It is, likewise, an object of the present invention to provide a brake shoe relining device which is compactly designed to accommodate a pair of brake shoes simultaneously and at the same time make very economical use of bench-space.

It is also an object of the present invention to provide a brake shoe relining device adapted to accommodate a pair of brake shoes at one time and so constructed as to minimize heat loss or sudden localized chilling due to vagrant air currents.

It is another object of the present invention to provide a brake shoe relining device of the type stated in which heat is applied as directly as possible to the adhesive zone, so that the brake shoe and lining and particularly the adhesive zone therebetween will be brought up to bonding temperature which can be maintained within relatively precise limits of control for any predetermined interval of time.

It is a further object of the present invention to provide a device of the type stated which can be speedily and accurately adjusted to accommodate for different thicknesses of the brake shoe flange or brake lining material and for different diameters in brake shoes.

It is also an object of the present invention to provide a brake shoe relining device which is simple, economical, and rugged and otherwise highly efficient in general operation.

With the above and other objects in view, my invention resides in the novel features of form, construction, arrangement, and combination of parts presently described and pointed out in the claims.

2

In the accompanying drawings (two sheets):

Figure 1 is a top plan view of a brake shoe relining device constructed in accordance with and embodying the present invention;

Figures 2 and 3 are front and rear elevational views, respectively, of the brake shoe bonding device;

Figure 4 is a fragmentary sectional view taken along line 4—4 of Figure 1;

Figure 5 is a fragmentary sectional view taken along line 5—5 of Figure 2; and

Figure 6 is a schematic wiring diagram showing the electrical connections to the brake shoe bonding device.

Referring now in more detail and by reference characters to the drawings, which illustrate practical embodiments of the present invention, A designates a brake shoe bonding machine comprising a horizontally disposed rectangular base 1 formed preferably of a heavy casting or forging and integrally including a wide front portion 2. Extending horizontally along the upper face of the base 1 rearwardly of the front portion 2 and midway between the lateral edges is a dovetail way 3 for snugly and slidably accommodating a dovetail tongue 4 formed integrally with and depending from the under side of a slide block 5. The way 3 is provided centrally of its bottom wall with a lengthwise extending groove 6 for slidably accommodating an internally threaded boss 7, formed integrally with and depending from the dovetail tongue 4. Journaled at its forward end in the forward portion 2 of the base 1, and extending lengthwise centrally through the groove 6, is a lead screw 8 which is diametrically enlarged and externally threaded, as at 9, along that portion of its length which is located within the groove 6 for extension through, and threaded engagement with, the boss 7. To prevent longitudinal translation, the lead screw 8 is provided with a set collar 10 adapted to bear against one transverse end wall of the front portion 2 and at its forward end the lead screw 8 projects outwardly from the base 1 and is rigidly provided with a crank-like handle 11.

Adjacent its rearward end, the slide block 5 is provided with an upstanding plate 12 and riveted, welded, or otherwise rigidly secured thereto are pairs of horizontally spaced parallel bands 13 formed of heavy gauge spring steel, spring bronze, or other similar material, and extending respectively outwardly to the left and right in horizontally disposed semi-circular arcs, being similarly secured at their forward ends to an upstanding plate 14 rigidly mounted on the front portion 2 of the base 1. The bands 13 in each pair are spaced uniformly apart at both ends, thus forming therebetween a narrow slot 15.

As the crank handle 11 is rotated in the proper direction, the slide block 5 will be run inwardly and the bands 13 will be simultaneously flexed to a semi-circular shape on a smaller radius.

Mounted in facewise contact against the under face of each band 13 is an electrical heating element 16 consisting of a central relatively narrow flat mica strip 17 for receiving a zig-zag winding of Nichrome ribbon 18. Securely held on opposite sides of the ribbon-winding 18 by rivets 19, or other suitable securement means, are relatively wider protective facing strips 20 also formed preferably of sheet mica or other suitable material. At its rearward end, each heating element 16 is set into a retaining socket 21 formed by a suitable stamped metal clip 22 rigidly mounted on the inner face of the plate 12. At its forward end, each heating element 16 is slidably mounted in a similar socket-forming clip 23 rigidly fastened upon the rear face of the plate 14.

Also disposed within the socket-forming clip 23 are compression springs 24 abutting at their lower ends against the transverse end face of the plate 14 and at their opposite ends against the inwardly presented end face of the heating element 16. Thus, each heating element 16 is resiliently urged upwardly to lie in snug-fitting engagement against the band 13 with which it is associated, and, as the latter flexes inwardly and outwardly, the heating element 16 will accommodate itself automatically to the curvature and snugly hug the under face of the band 13 at all times so as to transmit heat directly thereinto. Mounted on the under side of one heating element 16 in each set and carried by the rivets 19 in depending relation thereto are conventional bimetallic thermostats 25, each connected in series with one of the windings of Nichrome ribbon 18, and a conventional electrical input line 26 through a terminal block 27 and a five-bladed hand switch 28 mounted upon the upper face of the base 1. The electrical connections are substantially conventional and are schematically illustrated in Figure 6.

Formed integrally with and projecting rearwardly from the plate 13 are horizontally apertured bosses 29 adapted for receiving laterally extending adjustment rods 30, each threaded at its outer end for receiving an adjustment nut 31 and washer 32 for abutment against the lower end of a compression spring 33 mounted encirclingly about the outwardly projecting end of the rod 30 and abutting at its inner end against a collar slidably mounted on the shank of the rod 30 and rigidly provided with a vertical protuberance 34 having a hinge pin 35 projecting at both ends upwardly and downwardly therefrom for hinge-forming engagement within hinge eyes 36 formed integrally on the inward end of a clamping strap 37 which is substantially as wide as the combined width of the two bands 13 and extends flexibly thereover to the front of the machine. On its forward end, each strap 37 is provided with three transversely aligned hook-like reverse bends 38 spaced from each other by U-shaped clearance slots 39.

Rigidly mounted upon the forwardly presented face of the plate 14 are forwardly opening U-shaped pivot brackets 40, each supporting the opposite ends of a vertically extending pivot pin 41 upon which is rockably mounted a split toggle arm 42. Rockably pinned to, and extending swingably between, the split ends of each toggle arm 42 at a point spaced substantially inwardly from the pin 41 is an outwardly extending clevis-like arm 43 rigidly provided at its outer end with a transversely extending bar 44 adapted to be releasably engaged in the hook-like reverse bends 38, the upper ends of the clevis-like arm 43 being adapted to fit loosely within the clearance slots 39. By appropriate adjustment of the nut 31, allowance can be made for different thicknesses of the lining material and the brake shoe flange and, furthermore, the spring 33 can be adjusted to apply various clamping pressures, as may be required. Finally, the spring 33 will allow the strap 37 to give slightly as the temperature rises and the brake shoe, the lining, and the other parts of the device expand, thereby maintaining a practical degree of uniformity in clamping pressure throughout the bonding period.

It will, of course, be evident that, by turning the crank handle 11 in the appropriate direction, the slide block 5 may be shifted inwardly or outwardly as may be desired. As the slide block 5 is shifted inwardly, for example, the bands 13 and the heating elements 16 carried thereby will flex horizontally outwardly to assume a semi-circular arc of substantially smaller diameter. The upper face of the base 1 may be conventionally provided with a series of graduations for visual correlation with a suitable index mark on the slide block 5 to indicate the diameter of the arc of the bands 13. For example, the graduations can be numbered consecutively from "9" to "12" and so arranged that when the index mark of the slide block 5 is aligned with the graduation bearing the number "9," the bands 13 will be disposed in arcs having a nine inch diameter. If desired, a greater range of adjustment may be provided or intermediate graduations may be provided to permit intermediate fractional settings if for any reason such expedient may be deemed necessary.

At the present time, practically all passenger automobiles employ brake drums having diameters ranging from nine inches to twelve inches and the shoes are usually referred to in the same terms. In other words, a brake shoe which is designed to work within a brake drum having an inside diameter of nine inches is ordinarily referred to as a nine inch shoe. Actually, the diameter of the inside arc or under face of the shoe is substantially smaller than nine inches, but is nevertheless of a standard size. Thus, the graduations on the face of the base 1 can be calibrated and numbered, so that, when the index mark on the slide block 5 is precisely in registration with the graduation associated with the number "9," the bands 13 will have arcs of the exact size necessary to conform to the under face of a so-called nine inch brake shoe.

If the brake shoes B are normal in shape and size, they will fit snugly in place on the bands 13 without rocking or wobbling. On the other hand, if the brake shoes B have been stretched, shrunken, warped, or twisted in actual use, they will not fit properly on the bands 13 and the particular condition of malformation will be immediately revealed. In effect, the bonding machine A, therefore, serves the very valuable function of gauging the brake shoe B before it is relined to eliminate defective shoes.

If the brake shoes B line up properly in the machine A, they can then be removed and coated with an appropriate bonding adhesive by any conventional method and the preformed section of brake lining $x$ set lightly in place. There are a number of such adhesive bonding agents available, some of which are in the form of heavy viscous liquids or pastes and some in the form of a slightly tacky extruded ribbon or tape. In any case, the adhesive and lining are manually applied to the face of the brake shoe and lined up so as to be in the proper position thereon. The assembled lining and brake shoe are then replaced in the bonding machine A.

When the brake shoes B and the sections of lining $x$ are in place, the clamping straps 37 are swung forwardly over and around the outwardly presented arcuate faces of the linings and the bar 44 of each clevis arm 43 is engaged in the bends 38. The nuts 31 are then adjusted, if necessary, so that each clamping strap 37 will fit snugly down over the brake lining $x$. Thereupon the toggle arm 42 is swung down into the locked position shown in Figure 1 to draw the clamping strap 37 tightly down and squeeze the brake lining $x$ against the shoe B with a substantial amount of pressure. It will, of course, be evident that the amount of clamping pressure can be varied or adjusted by appropriate adjustment of the nut 31. The switch 28 is then turned on and the heating element 16 energized. Inasmuch as the heating element 16 is mounted directly against the under face of the bands 13, the heat will be very quickly transmitted through the bands 13 directly into the brake shoes B and to the adhesive bonding agent. Because the brake shoes B are held rigidly in a viselike grip during the entire heating cycle, it is virtually impossible for the shoe or lining to warp or become otherwise distorted. Finally, the thermostats 25 may be set to maintain a bonding temperature precisely within the optimum range specified for the particular bonding agent or adhesive being used, thus eliminating the danger of overheating the shoe and scorching either the bonding agent or the brake lining itself. Since each band 13 has its own thermostat 25, a substantially uniform temperature is maintained across the entire flange of the brake shoe B in spite of vagrant air currents which may tend to cool the bands 13 unequally.

It will be noted that the heating elements 16 of the bonding machine A are wired or connected in the circuit shown in Figure 6, in which each pair of heating elements 16, together with their associated thermostats 25, is connected through switch 28, which is of the double-throw, double-pole type, in such a manner that the heating elements 16 may be alternatively connected in series or in parallel. When connected in parallel, the thermostats 25 are by-passed and, furthermore, the temperature will be almost twice the normal desired temperature. This type of circuit arrangement makes it possible to place used brake shoes in the machine with the outworn lining still in place, and at such elevated temperature, the bonding agent will be carbonized so that the outworn linings can be knocked off with a mere hammer-tap. Therefore, the bonding machine A can be used for the additional purpose of removing old, worn brake linings from brake shoes prior to the relining operation. It has been found that the temperature at which the bonding agent is effectively destroyed does not in any way damage the brake shoes themselves. After removal of the worn lining has been completed, the switch 28 may be moved to its other or "series-connected" position, whereupon the temperature is under control of the thermostat 25 and is held within optimum bonding range.

It should be understood that changes and modifications in the form, construction, arrangement, and combination of the several parts of the brake shoe bonding machine may be made and substituted for those herein shown and described without departing from the nature and principle of my invention.

Having thus described my invention, what I claim and desire to secure by Letters Patent is:

1. A brake shoe relining machine comprising a base, oppositely curved pairs of flexible arcuate members adjustably mounted upon the base, means operatively engaged with said pairs of arcuate members for simultaneously flexing said members into various different arcs within predetermined limits, and flexible heating elements disposed snugly against the concave faces of each of the arcuate members.

2. A brake shoe relining machine comprising a base, oppositely curved, horizontally disposed pairs of flexible arcuate members, each rigidly mounted at one end upon the base, means operatively mounted on the base for shiftable movement with respect thereto, said means being engaged with the other end of each of the arcuate members for simultaneously drawing the ends thereof together and thereby simultaneously flexing said arcuate members into various different arcs within predetermined limits, and flexible heating elements disposed snugly against the concave faces of each of the arcuate members.

3. A brake shoe relining machine comprising a base, oppositely curved, horizontally disposed pairs of flexible arcuate members, each fixed at one end upon the base, means operatively mounted on the base for shiftable movement with respect thereto along a line lying between said arcuate members, said means being engaged with the other end of each of the arcuate members for simultaneously drawing the ends thereof together and thereby flexing said members into various different arcs within predetermined limits, and flexible heating elements disposed snugly against the concave faces of each of the arcuate members.

4. A brake shoe relining machine comprising a base, a block mounted on the base for horizontal adjustment therealong, a pair of vertically spaced, horizontally disposed solid metallic bands, said bands being thin enough to be capable of limited flexure and at the same time being sufficiently rigid for underlying supportive engagement against the concave under face of a brake shoe flange, said bands being both anchored in common at one end to the base and at the other end to the block for simultaneous flexing thereby as the block is adjusted, and flexible heating elements disposed snugly against the concave faces of each of the arcuate members.

5. A brake shoe relining machine comprising a base, a block mounted on the base for horizontal adjustment therealong, a pair of vertically spaced, horizontally disposed self-supporting spring-steel bands, each anchored at one end to the base and at the other end to the block for simultaneous flexing thereby as the block is adjusted, and a flexible electric heating element disposed snugly against the concave under faces of each of the arcuate bands.

6. A brake shoe relining machine comprising a base having an upstanding member, a block mounted on the base for lengthwise adjustment therealong and having an upstanding member, two pairs of oppositely extending, vertically spaced parallel bands anchored at one end to the upstanding member of the base and flexed in outwardly extending arcs, said bands being attached at their opposite ends to the upstanding member of the block, flexible heating elements disposed snugly against the concave faces of each of said bands for flexure therewith.

7. A brake shoe relining machine comprising a base having an upstanding member, a block mounted on the base for horizontal adjustment therealong and having an upstanding member, a pair of horizontally disposed, vertically spaced parallel bands formed of springy metal and being anchored at one end to the upstanding member of the base and flexed in a horizontal arc, said bands being attached at their opposite ends to the upstanding member of the block, and a flexible electric heating element disposed snugly against the concave under faces of each of the bands.

8. A brake shoe relining machine comprising a base, oppositely curved, horizontally disposed pairs of flexible arcuate members, each rigidly mounted at one end upon the base, means operatively mounted on the base for shiftable movement with respect thereto, said means being engaged with the other end of each of the arcuate members for simultaneously drawing the ends thereof together and thereby simultaneously flexing said arcuate members into various different arcs within predetermined limits, flexible heating elements disposed snugly against the concave faces of each of the arcuate members, and clamping means operatively mounted on the base for overlying said arcuate members.

9. A brake shoe relining machine comprising a base having an upstanding member, a block mounted on the base for horizontal adjustment therealong and having an upstanding member, a pair of horizontally disposed, vertically spaced parallel bands anchored at one end to the upstanding member of the base and flexed in a horizontal arc, said bands being attached at their opposite ends to the upstanding member of the block, and band-like clamping members swingably and resiliently mounted at one end on the base and extending arcuately over each pair of said bands in overlying relation upon brake shoes supported upon the bands and being provided at their other ends with latching means for optional engagement with the base whereby to draw the clamping members tightly upon the supported brake shoes.

HARRY B. BARRETT.

References Cited in the file of this patent

UNITED STATES PATENTS

| Number | Name | Date |
|---|---|---|
| 707,442 | Moon | Aug. 19, 1902 |
| 1,316,190 | Sackerman | Sept. 16, 1919 |
| 1,434,022 | Peed | Oct. 31, 1922 |
| 1,541,551 | Backstrom | June 9, 1925 |
| 2,444,191 | Friberg | June 29, 1948 |
| 2,489,496 | O'Brien | Nov. 29, 1949 |
| 2,494,281 | Batchelor et al. | Jan. 10, 1950 |
| 2,523,507 | Langford et al. | Sept. 26, 1950 |